(12) United States Patent
Hsu et al.

(10) Patent No.: US 7,212,379 B2
(45) Date of Patent: May 1, 2007

(54) PERPENDICULAR MAGNETIC RECORDING HEAD WITH FLARE AND TAPER CONFIGURATIONS

(75) Inventors: Yimin Hsu, Sunnyvale, CA (US); Quang Le, San Jose, CA (US); Jui-Lung Li, San Jose, CA (US); Ian Robson McFadyen, San Jose, CA (US); James Lamar Nix, Gilroy, CA (US); Neil Leslie Robertson, Palo Alto, CA (US); Mason Lamar Williams, III, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 420 days.

(21) Appl. No.: 10/815,286

(22) Filed: Mar. 31, 2004

(65) Prior Publication Data

US 2005/0219747 A1    Oct. 6, 2005

(51) Int. Cl.
*G11B 5/31* (2006.01)

(52) U.S. Cl. ...................................... 360/126

(58) Field of Classification Search ............... 360/126, 360/125, 122
See application file for complete search history.

(56) References Cited

U.S. PATENT DOCUMENTS

| | | | |
|---|---|---|---|
| 4,636,897 A | 1/1987 | Nakamura et al. ........... 360/119 |
| 4,703,382 A | 10/1987 | Schewe et al. .............. 360/125 |
| 4,807,076 A | 2/1989 | Nakashima et al. ........ 360/126 |
| 4,839,761 A | 6/1989 | Gatzen ........................ 360/103 |
| 5,659,446 A | 8/1997 | Tanaka et al. .............. 360/125 |
| 5,995,341 A | 11/1999 | Tanaka et al. .............. 360/125 |
| 6,501,619 B1 * | 12/2002 | Sherrer et al. .............. 360/126 |
| 6,842,313 B1 * | 1/2005 | Mallary ....................... 360/126 |
| 2002/0141111 A1 | 10/2002 | Batra et al. ................. 360/125 |
| 2003/0117749 A1 | 6/2003 | Shukh et al. ............... 360/317 |
| 2004/0004787 A1 * | 1/2004 | Matono et al. ............. 360/126 |
| 2004/0212923 A1 * | 10/2004 | Taguchi ..................... 360/125 |
| 2005/0068678 A1 * | 3/2005 | Hsu et al. ................... 360/126 |

FOREIGN PATENT DOCUMENTS

| | | |
|---|---|---|
| JP | 61149106 | 9/1986 |
| JP | 62177710 | 8/1987 |
| JP | 63029311 | 2/1988 |
| JP | 63098815 | 4/1988 |
| JP | 3209609 | 9/1991 |
| JP | 7225912 | 8/1995 |
| JP | 2001266310 | 9/2001 |

OTHER PUBLICATIONS

Zhou, Hong et al., "Analyses of the effect of head imaging on medium demagnetization field in perpendicular recording", Journal of Applied Physics, vol. 93, No. 10, May 15, 2003, pp. 6537-6539.

* cited by examiner

*Primary Examiner*—Craig A. Renner
(74) *Attorney, Agent, or Firm*—Zilka-Kotab, PC

(57) ABSTRACT

A magnetic write head for use in perpendicular magnetic data recording. The write head includes a write pole and a trailing shield having a tapered surface. A return pole stitched to the trailing shield is magnetically connected with the write pole at a location away from the air bearing surface (ABS).

8 Claims, 10 Drawing Sheets

PERPENDICULAR MAGNETIC RECORDING HEAD WITH FLARE AND TAPER CONFIGURATIONS

FIELD OF THE INVENTION

The present invention relates to perpendicular magnetic recording, and more particularly to a trailing shield design using a trailing shield taper for improved magnetic field strength and field gradient performance.

BACKGROUND OF THE INVENTION

At the heart of a computer is a magnetic disk drive that includes a magnetic disk, a slider where a magnetic head assembly including write and read heads is mounted, a suspension arm, and an actuator arm. When the magnetic disk rotates, air adjacent to the disk surface moves with it. This allows the slider to fly on an extremely thin cushion of air, generally referred to as an air bearing. When the slider flies on the air bearing, the actuator arm swings the suspension arm to place the magnetic head assembly over selected circular tracks on the rotating magnetic disk, where signal fields are written and read by the write and read heads, respectively. The write and read heads are connected to processing circuitry that operates according to a computer program to implement write and read functions.

Typically magnetic disk drives have been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track.

Data density requirements are fast approaching the physical limits, however. For example, increases data capacity requires decreased bit sizes, which in turn requires decreasing the grain size of the magnetic medium. As this grain size shrinks, the magnetic field required to write a bit of data increases proportionally. The ability to produce a magnetic field strong enough to write a bit of data using conventional longitudinal write head technologies is reaching its physical limit.

One means for overcoming this physical limit has been to introduce perpendicular recording. In a perpendicular recording system, bits of data are recorded magnetically perpendicular to the plane of the surface of the disk. The magnetic disk may have a relatively high coercivity material at its surface and a relatively low coercivity material just beneath the surface. A write pole having a small cross section and very high flux emits a strong, concentrated magnetic field perpendicular to the surface of the disk. This magnetic field emitted from the write pole is sufficiently strong to overcome the high coercivity of the surface material and magnetize it in a direction perpendicular to its surface. This flux then flows through the relatively magnetically soft underlayer and returns to the surface of the disk at a location adjacent a return pole of the write element. The return pole of the write element has a cross section that is much larger than that of the write pole so that the flux through the disk at the location of the return pole (as well as the resulting magnetic field between the disk and return pole) is sufficiently spread out to render the flux too week to overcome the coercivity of the disk surface material. In this way, the magnetization imparted by the write pole is not erased by the return pole.

It will be appreciated by those skilled in the art that the high coercivity of the disk surface material can make it difficult to magnetize, especially at increasingly small magnetic grain sizes. It has been found that angling the magnetic field slightly can improve transition sharpness and achieve better media signal to noise ratio. A proposal to achieve this has been to place a trailing shield near the write gap and magnetically connected with the return pole. The shield would in effect attract field emitted from the write pole, thereby angling it slightly.

A challenge encountered with this approach is that some field is lost to the shield, and increasing write field to compensate for this can lead to adjacent track interference due to stay fields. In other word, using a trailing shield to angle the magnetic field emitted from the write pole advantageously decreases the switching field necessary to make the perpendicular magnetic transition, increasing the speed with which data can be written. However, this improvement in switching field comes at the cost of lost magnetic field. This is because some of the field leaks to the shield (in a direction parallel to the disk surface) resulting a weaker field being emitted by the write pole. Therefore, there remains a strong felt need for a mechanism for canting the magnetic field of a perpendicular write pole, while minimizing field loss. In addition, a mechanism for doing so would have to manufacturable in a mass production setting to practicable.

SUMMARY OF THE INVENTION

The present invention provides a magnetic write head for perpendicular recording that provides improved write field and write gradient performance. The write head includes a write pole and a trailing shield having a tapered surface. A return pole stitched to the trailing shield is magnetically connected with the write pole at a location away from the ABS surface.

The tapered surface of the trailing shield can be parallel to an adjacent tapered surface of the write pole. The use of a trailing shield in a perpendicular magnetic write head improves write performance, but also leads to lost field leaking from the write head to the shield through the write gap, which can result in reduced write field strength. The tapered surface of the trailing shield alleviates this lost field while retaining the advantage of having a trailing shield present. By tapering a surface of the shield, and preferably adjacent portion of the write pole, any field leaking to the sensor will be canted in a direction toward the ABS. A component of this field vector is in a desired direction perpendicular to the ABS (toward the magnetic medium) and therefore contributes to field strength. Experiments have shown substantial write performance through the use of such a tapered shield.

In order to avoid side writing, which might otherwise contribute to adjacent track interference, the tapered trailing shield can include laterally flared wing portions as well as a taper. These laterally flared wing portions could initiate at a point closer to the ABS than the point of taper initiation.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
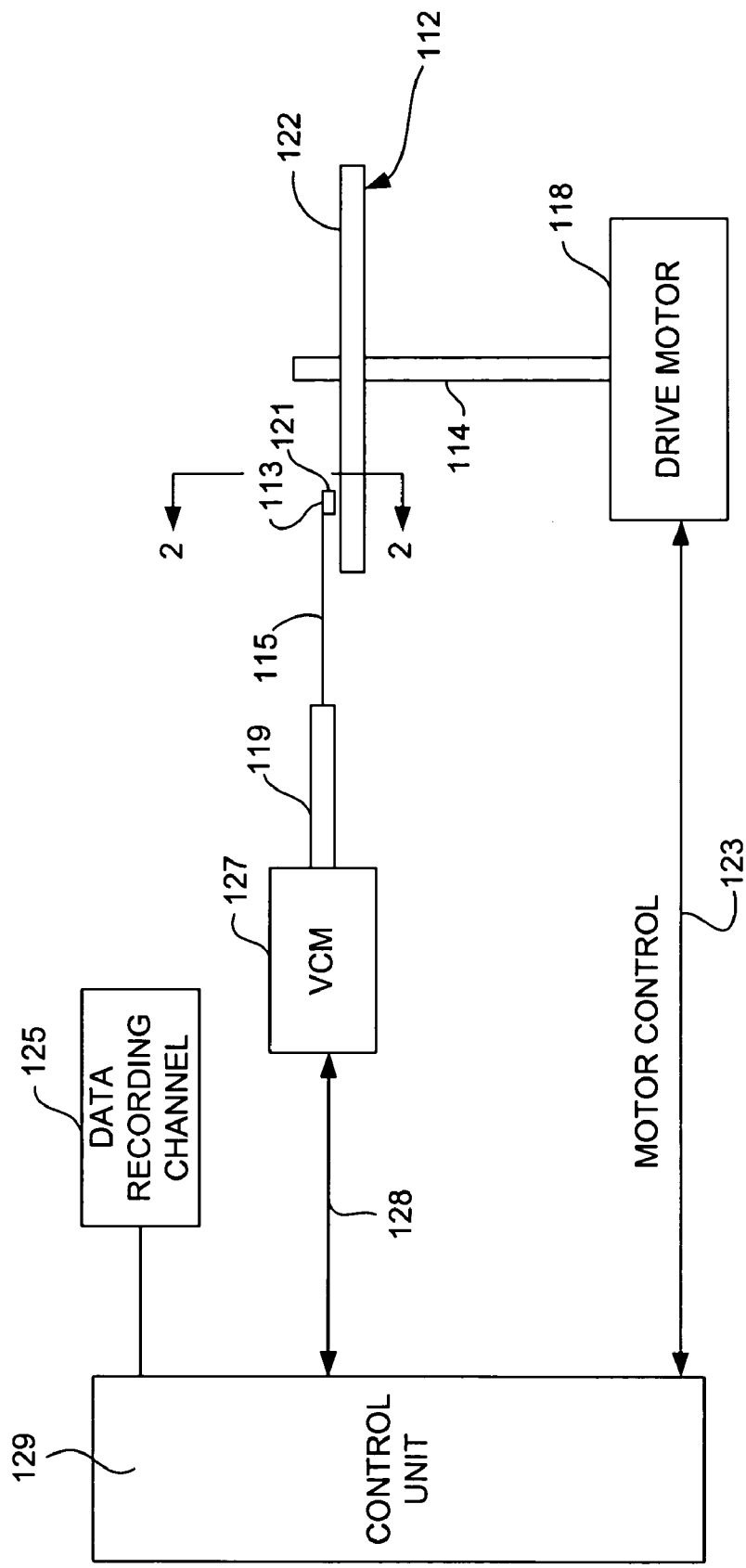
FIG. 1 is a schematic view of a magnetic storage system in which the present invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
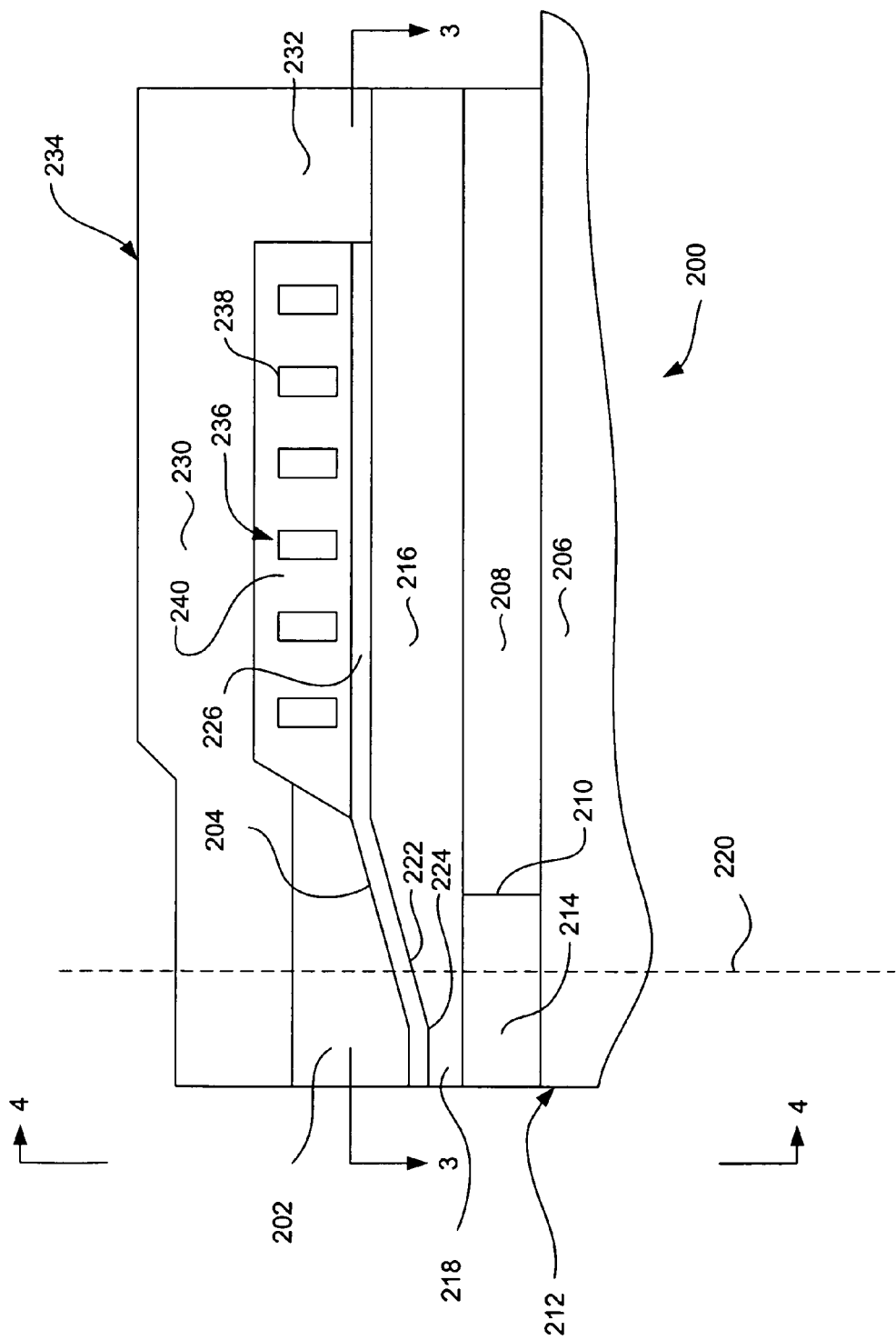
FIG. 2 is a cross sectional view of a perpendicular magnetic write head according to an embodiment of the present invention.

With reference to FIG. 2, the present invention provides a write head 200, for use in perpendicular recording that has a trailing shield 202 incorporating a tapered surface 204 for improved magnetic performance. The write head is built upon a dielectric layer 206, that can be for example alumina $Al_2O_3$ or some other non-magnetic material. The dielectric layer 206 is generally formed on top of a read element (not shown) and separated the write head 200 there from.

A magnetic shaping layer 208 is formed over the substrate 206 and has an end 210 that is recessed from an air bearing surface (ABS) 212. A non-magnetic, dielectric material 214 fills the space between the end 210 of the shaping layer 208 and the ABS 212. The shaping layer 208, and fill material 214, preferably have coplanar upper surfaces which can be produced by a chemical mechanical polishing process.

Figure 3:
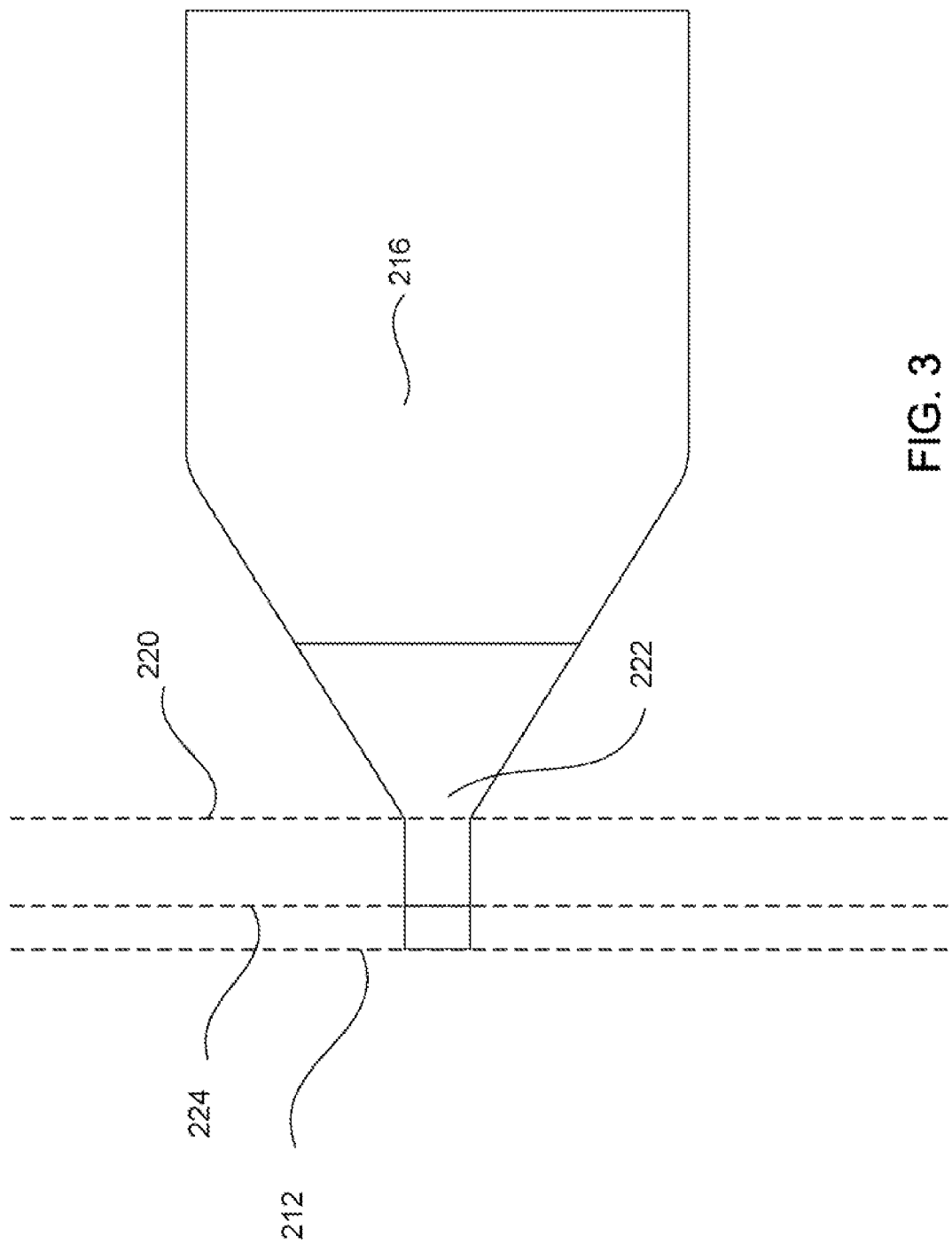
FIG. 3 is a plan view, taken from line 3—3 of FIG. 2. illustrating a write pole for use in the embodiment illustrated in FIG. 2.
Figure 4:
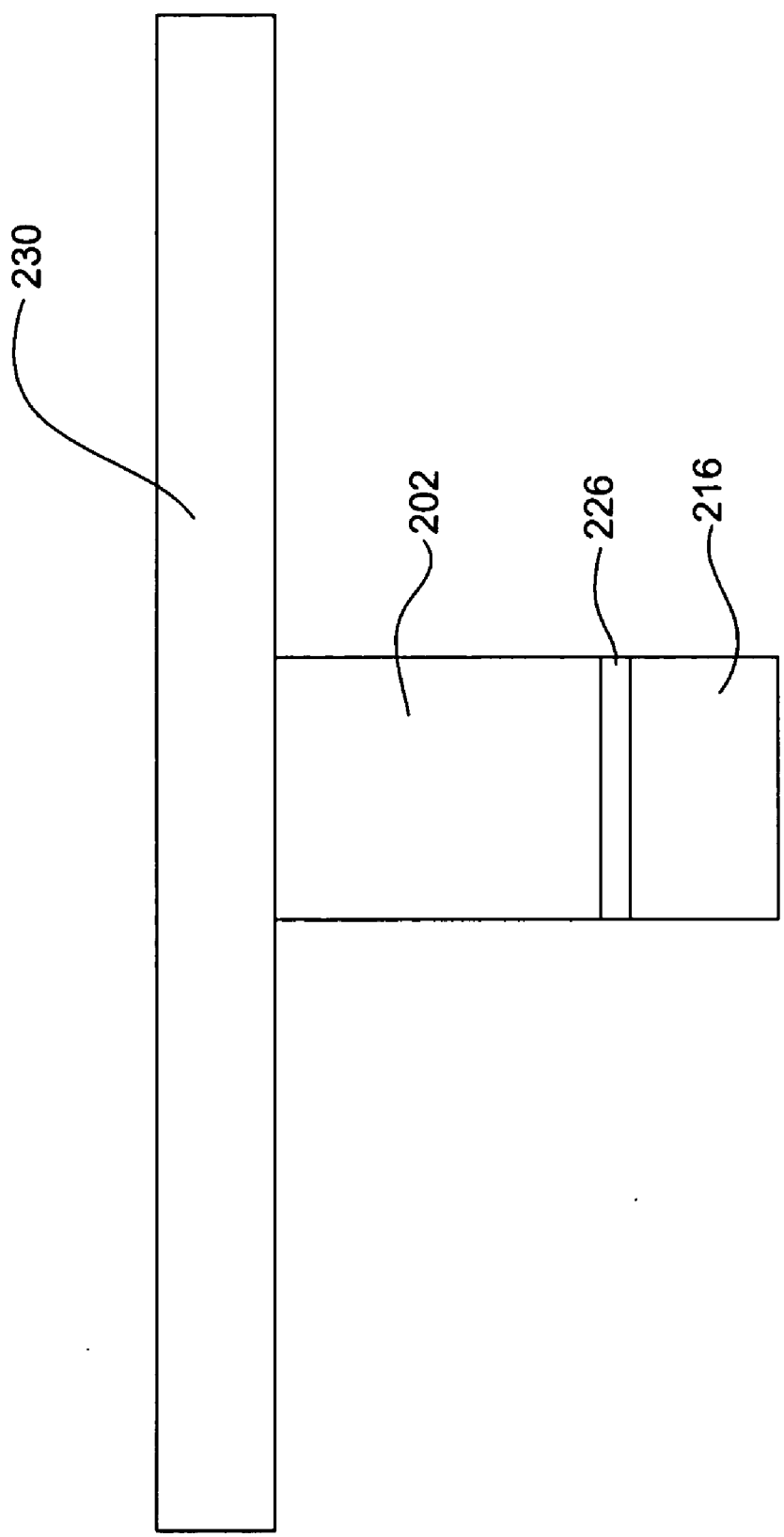
FIG. 4 is an ABS view, taken from line 4—4 of FIG. 2, of the embodiment illustrated in FIG. 2.

With continued reference to FIG. 2 a write pole 216 is formed over the shaping layer and has a pole tip 218, which extends to the ABS surface 212. Whereas the write pole extends straight back from the ABS in the pole tip region 218 for short distance, at a flare point indicated by line 220, the write pole begins to flare laterally outward, which can be seen more readily with reference to FIG. 3. With reference to FIG. 2, the write pole has a tapered portion 222, which may initiate at a point 224, which may occur before the flare point 220 of the write pole 216, or could occur after the flare point 220 (ie. further from the ABS) depending upon design requirements.

A thin non-magnetic write gap layer 226 is formed over the write pole. The write gap layer 226, can be formed of many non-magnetic materials, such as alumina $Al_2O_3$, and in is preferably formed of a layer of alumina and a layer of diamond like carbon, for reasons that will be discussed below.

The tapered trailing shield 202 is formed over the write gap layer 226 in the pole tip region 218 of the write element 200. The trailing shield assumes shape of the write pole 216 over which it is formed, having a tapered shape 204 at its bottom that corresponds with the taper 222 of the write pole 216. In this sense the taper begins at essentially the same distance 224 from the ABS 212.

A magnetic return pole 230 is stitched to the top of the trailing shield 202 and extends back to a back gap region 232, where it magnetically connects with the write pole 208 forming a magnetic yoke 234 therewith. The writer 200 also includes an electrically conductive coil 236, having a plurality of winds 238 (shown in cross section), which pass through the magnetic yoke 234. A non-magnetic, dielectric layer 240 surrounds and insulates the winds 238 of the coil 236.

The presence of the magnetic shield 202 improves the field gradient and improves switching field performance by advantageously canting the write field emitted from the write pole 216. However, previously the presence of a trailing shield has meant a loss of write field. Prior art designs have used trailing shields and write poles adjacent thereto that extend straight back from the ABS with no taper. In other words, the surfaces of the trailing shield and write pole in contact with the write gap were extended perpendicular to the ABS. Field lost between the write pole and shield using such a design could be described as a vector oriented parallel with the ABS and perpendicular to the primarily desired direction of emitted write field. Therefore, no component of this vector of lost field contributes to write field. By providing a taper 228 on the trailing shield, field leaking between the write pole and the trailing shield is angled toward the magnetic medium. A component of this vector then contributes to write field and improves write field strength. Experimentation has shown significant improvement in write field performance through the use of such a tapered trailing shield 202. The tapered surface portion of the trailing shield 202 defines a plane having an angle of preferably less than 90 degrees with respect to the ABS and more preferably and angle of between 60 and 90 degrees with respect to the ABS.

Figure 5:
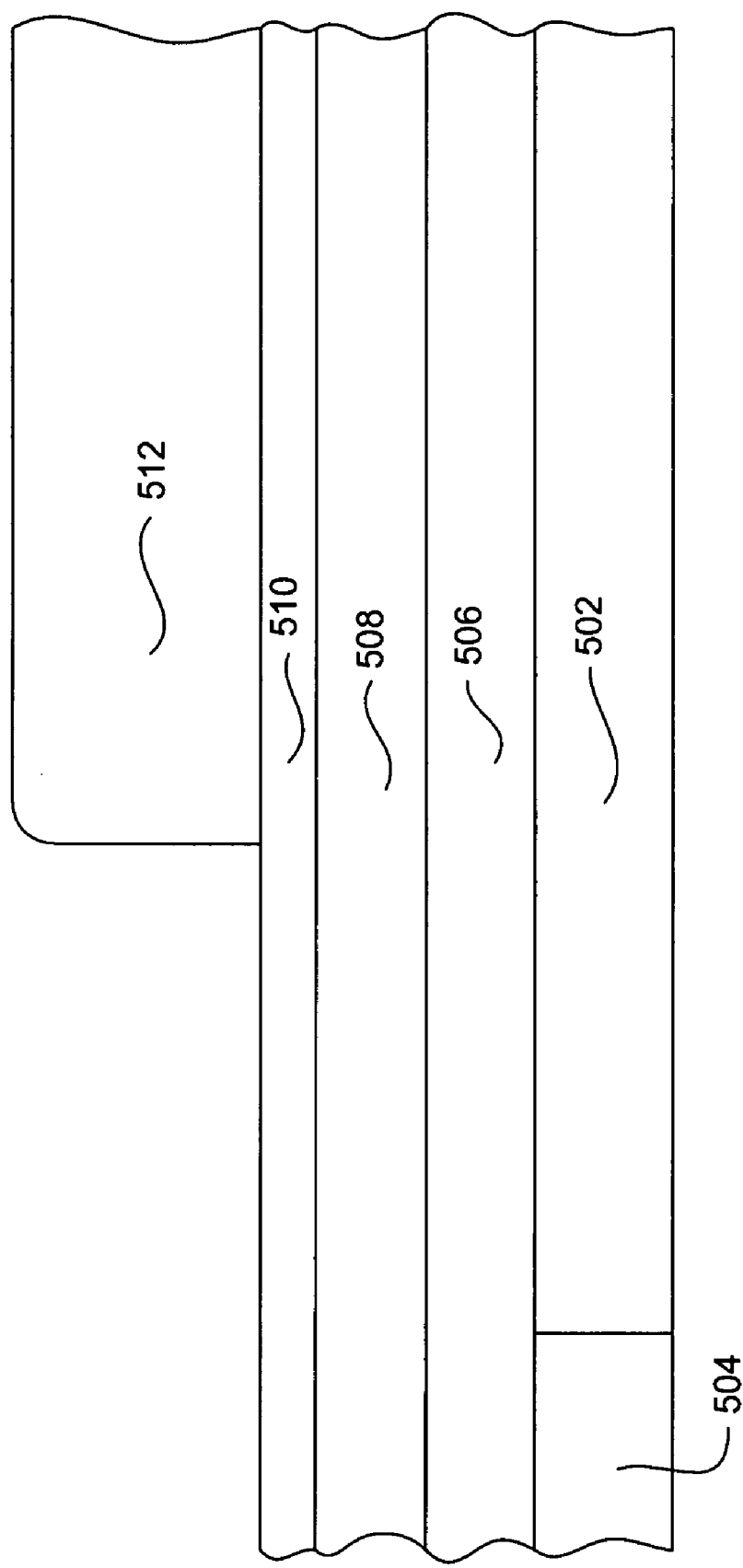
FIGS. 5–8 are cross sectional views of a portion of a magnetic write element in intermediate stages of manufacture.

FIGS. 5–8 illustrate a process for constructing such a tapered trailing shield perpendicular write head 200. With reference to FIG. 5, a shaping layer 502 and an adjacent layer of non-magnetic material 504 such as alumina are formed on a substrate (not shown). These can be formed by processes familiar to those skilled in the art and may include photolithographic processes using a photoresist mask (not shown), sputter depositing an electrically conductive seed layer and electro-plating the shaping layer 502. The shaping layer 502 can be constructed of for example NiFe.

A first layer of magnetic write pole material 506 can then be deposited, such as by electroplating. This layer of write pole material is preferably a very high saturation, low coercivity material, and is preferably formed of laminated layers of a high magnetic saturation material (high Bsat) such as CoFe, NiFe or their alloys with interspersed non-magnetic film such as Cr, Ru, etc. A second layer of write pole material 508 is then deposited on top of the first layer 506. This second layer 508 may be a magnetic material that is more readily removed by reactive ion etching than the first layer 506.

Thereafter a layer of Ta may be deposited, followed by a mask 512, such as photoresist. As illustrated in FIG. 5, the mask 512 has a front edge that terminates at a desired taper stop point and extends backward therefrom.

Figure 6:
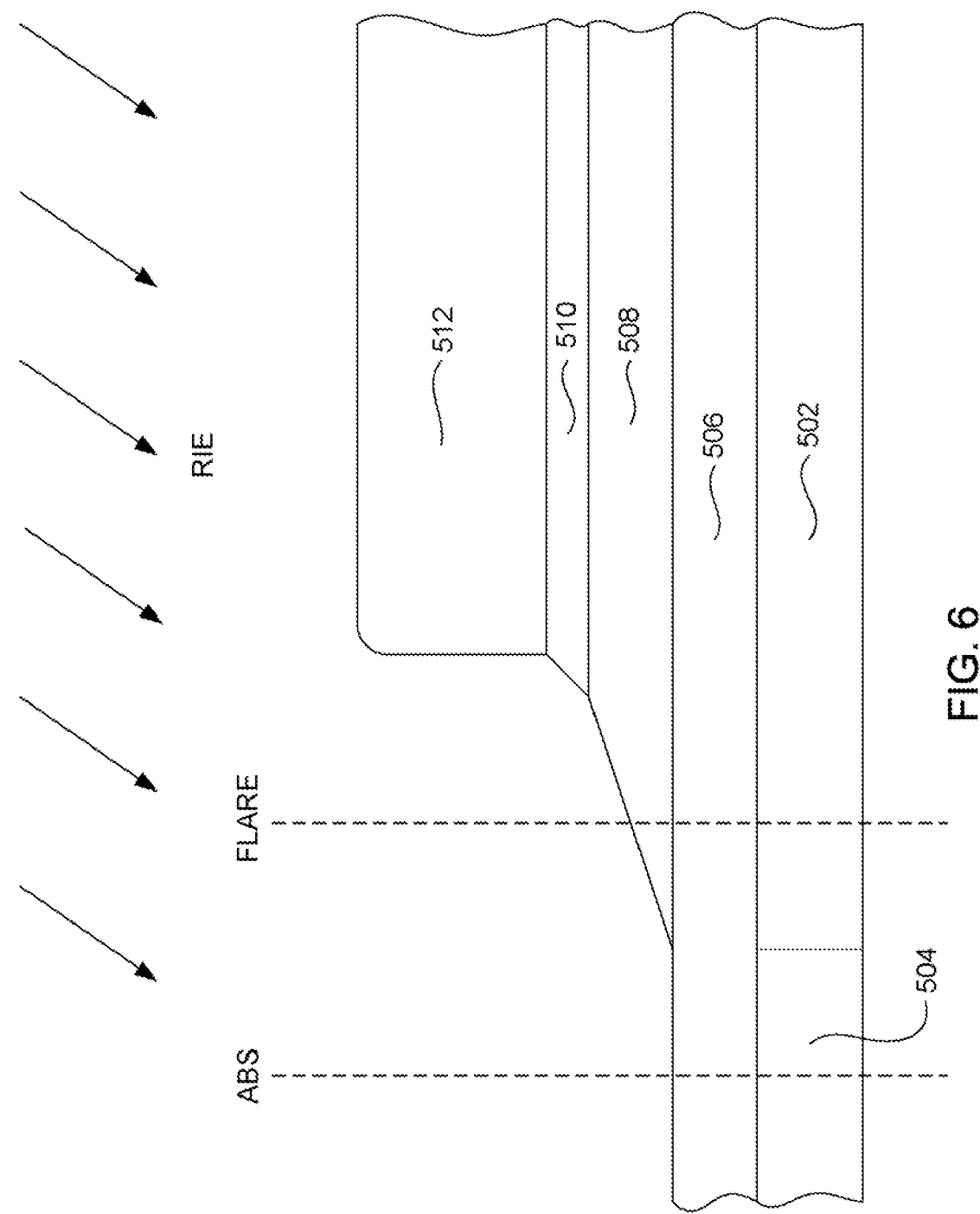

With reference now to FIG. 6, a RIE process may be performed to remove portions of the Ta layer 510 and 508. Preferably the RIE process is performed at an angle as shown, so that the shadowing effect of the mask will promote a tapered removal of material also as shown. Since as mentioned above, the first magnetic pole layer 506 is constructed of a material that is not as readily removed by RIE, the surface will tend flatten out when that surface is reached and at that point the RIE process should be stopped.

Figure 7:
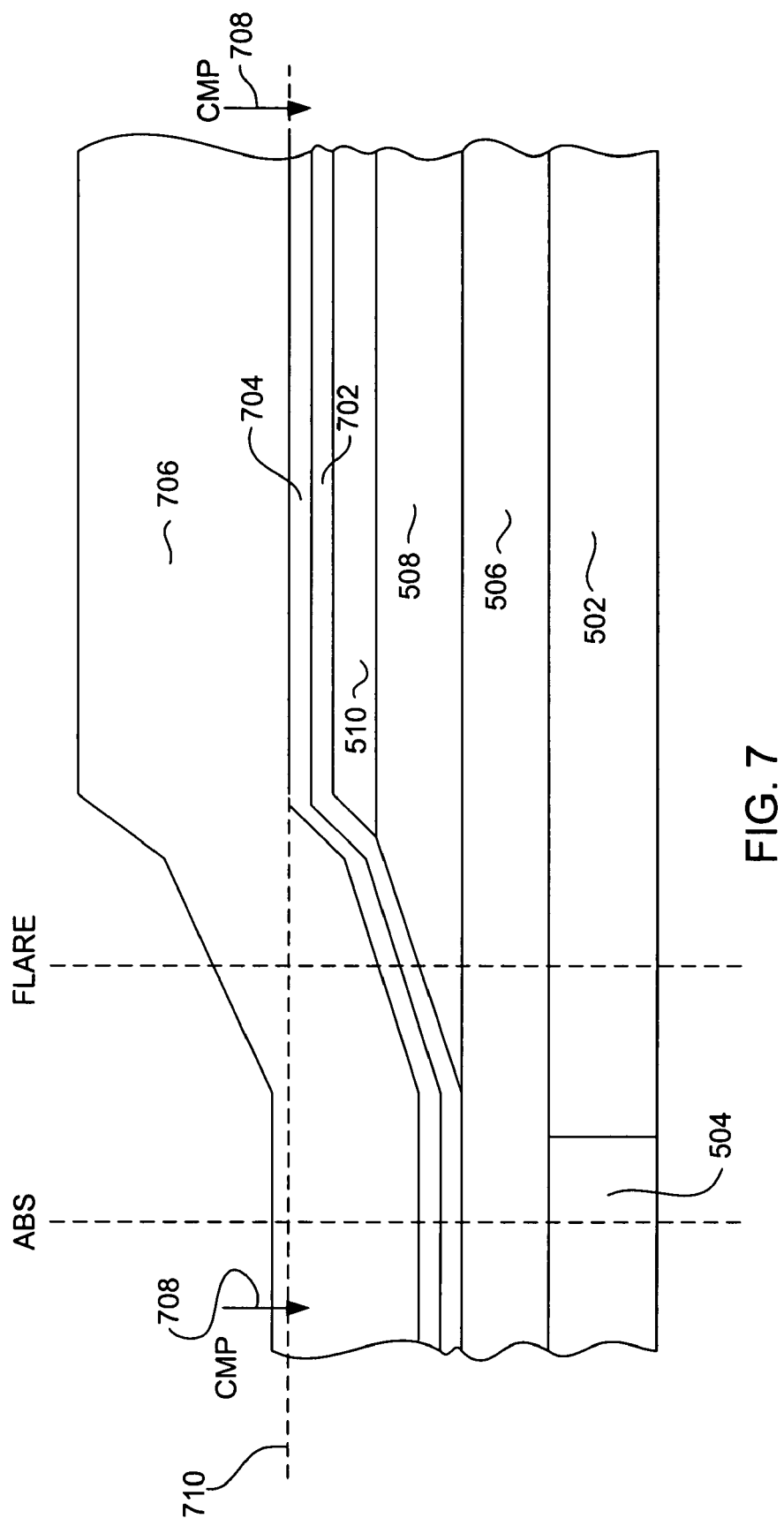

With reference now to FIG. 7, the mask 512 can be removed and successive thin layers of write gap material 702, and diamond like carbon (DLC) 704 deposited. The write gap material can be several non-magnetic materials and is preferably alumina. The write gap 702, and DLC 704 can be deposited by sputter deposition. Thereafter a relatively thicker layer of magnetic shield material 706 such as NiFe is deposited by processes such as seed layer sputtering, and electroplating. A chemical mechanical polishing process CMP 708 can then be performed, using the DLC layer 704 as a CMP stop so that the CMP process 708 stops at a desired level 710.

Figure 8:
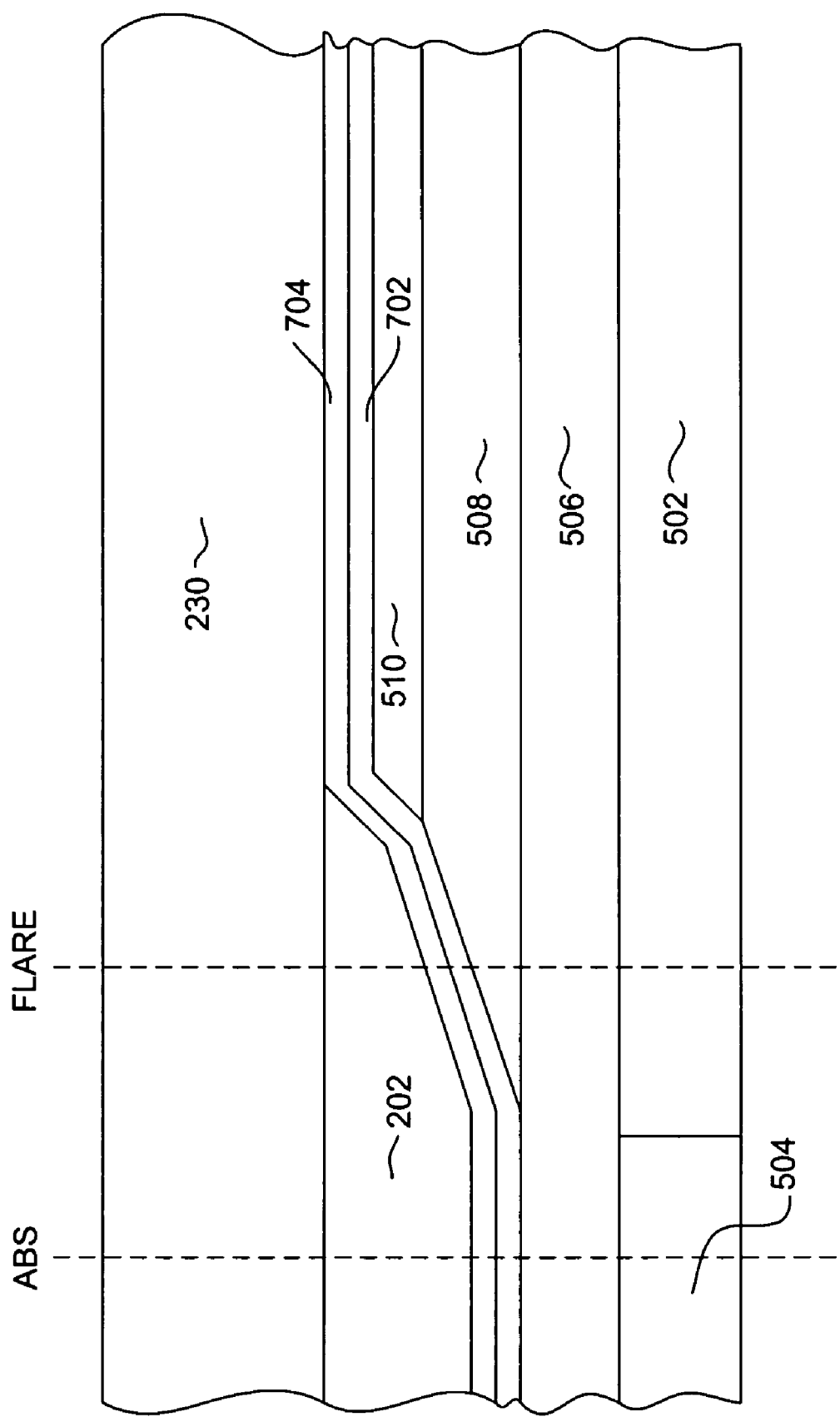

With reference to FIG. 8, a return pole 230 can then be constructed of a magnetic material such as NiFe. Although not visible in FIG. 8, the return pole 230 is laterally much wider than the shield 202 or the write pole tip 218.

Figure 9:
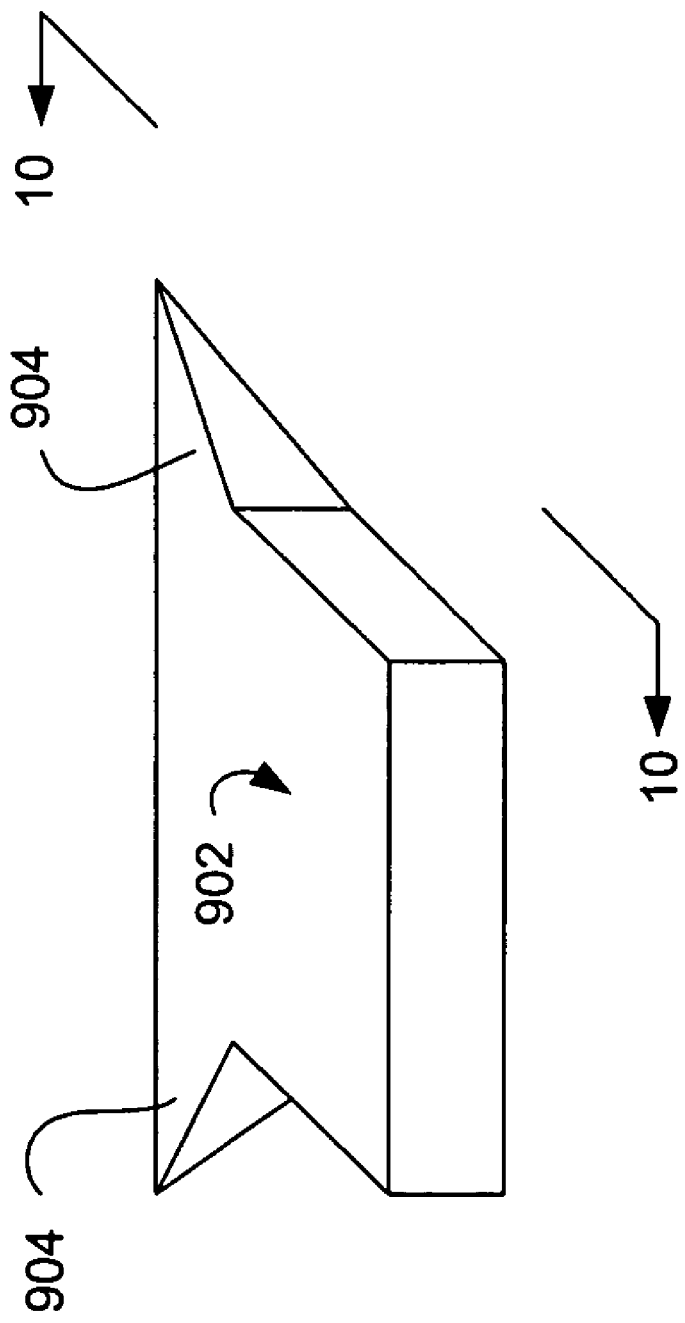
FIG. 9 is perspective view of a tapered shield according to an embodiment of the invention.
Figure 10:
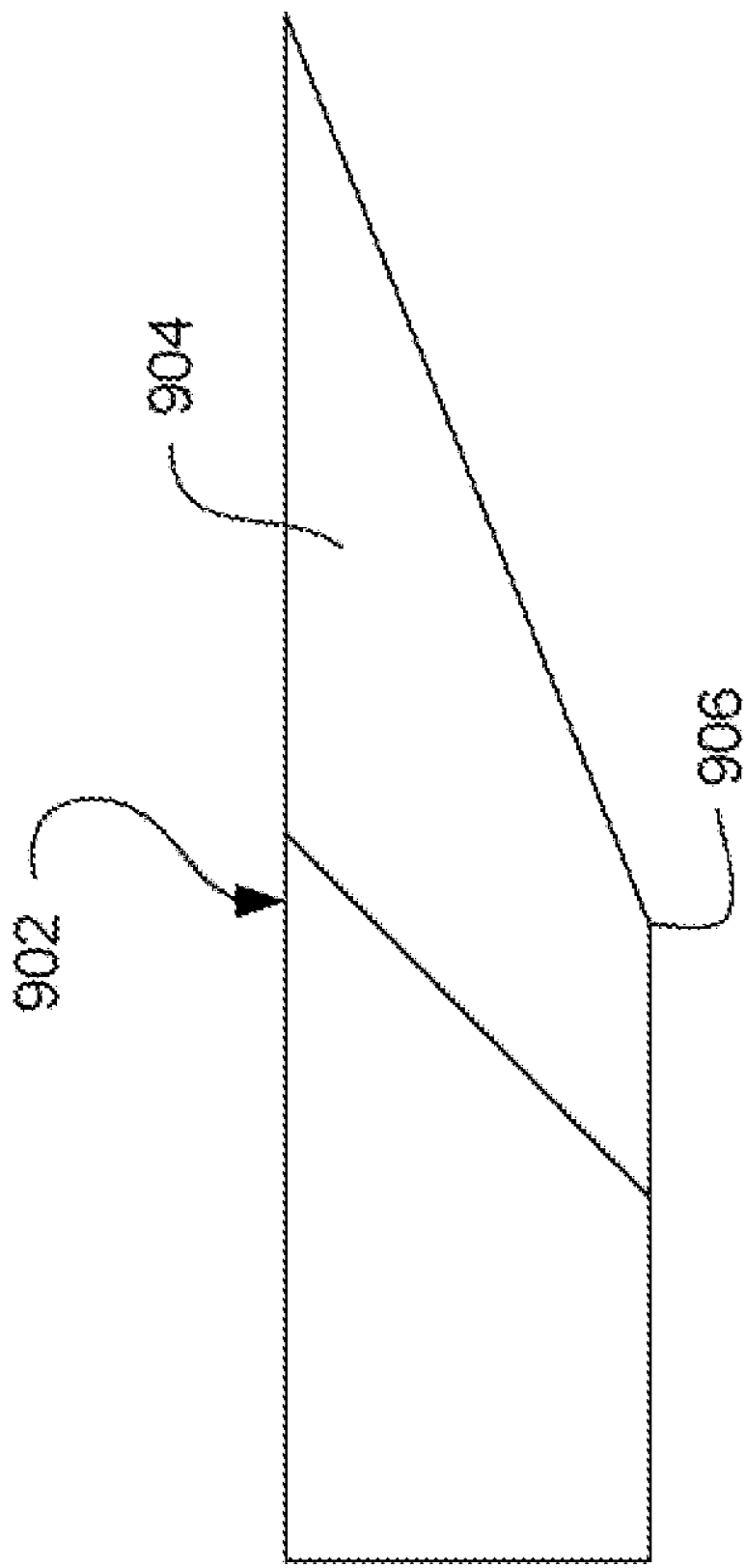
FIG. 10 is a side view of the tapered shield illustrated in FIG. 9.

With reference to FIGS. 9 and 10, an embodiment of the tapered shield 902 can include laterally extending flares or wings 904. Such flares 904 can be beneficial in reducing side writing which might otherwise interfere with adjacent tracks of data on the magnetic medium 112 (FIG. 1). Such laterally extending flares, or wings 904 would preferably be disposed in front of the taper line 906 (ie. closer to the ABS), for optimal performance.

While various embodiments have been described above, it should be understood that they have been presented by way of example only, and not limitation. Other variation and embodiments falling within the scope of the invention will, no doubt be apparent to those skilled in the art. For example, while the present invention was described with reference to a writer having a Return pole formed above the write pole (ie. trailing), the present invention could also be practiced on a perpendicular write element having a return pole below (ie. leading) the write pole. Thus, the breadth and scope of a preferred embodiment should not be limited by any of the above-described exemplary embodiments, but should be defined only in accordance with the following claims and their equivalents.

What is claimed is:

1. A write element for perpendicular magnetic recording, comprising:
 a write pole terminating at a plane defining an air bearing surface and having a track width measured parallel to the air bearing surface;
 a return pole magnetically connected with said write pole in a back gap area and having a width greater than said track width;
 said write pole being one or more layers of magnetic material having a tapered surface portion wherein said write pole becomes progressively thicker with increased distance from said air hearing surface;
 a magnetic shield, magnetically connected with said return pole, and having a tapered surface portion substantially parallel with said tapered surface portion of said write pole and separated from said write pole by a non-magnetic write gap layer.

2. A write element as in claim 1, wherein said tapered surface portion of said magnetic shield defines an angle of less than 90 degrees with respect to said air bearing surface.

3. A write element as in claim 1, wherein said tapered surface portion of said magnetic shield defines an angle of between 60 and 90 degrees with respect to said air bearing surface.

4. A magnetic write element as in claim 1, wherein said shield is configured with a flared portion having a lateral width that increases with increasing distance from said air bearing surface, and wherein said flared portion of said shield initiates closer to said air bearing surface than said tapered surface portion of said shield.

5. A magnetic write element as in claim 1, wherein said write pole is configured with a flared portion having a lateral width that increases with increasing distance from said air bearing surface, and wherein said tapered surface portion of said write pole initiates closer to said air bearing surface than said flared portion of said write pole.

6. A magnetic write element as in claim 1, wherein said tapered shield further includes first and second laterally flared wing portions.

7. A magnetic write element as in claim 6, wherein said laterally flared wing portions initiate at a point closer to the air bearing surface than said tapered surface portion of said shield.

8. A magnetic write element for perpendicular magnetic recording, comprising:
 magnetic write pole having a track width and terminating at an air bearing surface (ABS);

a magnetic return pole having a width substantially larger than said write pole, said return pole being in magnetic connection with said write pole in a back gap area;

a trailing shield, said shield having a tapered surface that is disposed adjacent to said write pole and separated therefrom by a non-magnetic write gap;

wherein said tapered shield further includes first and second laterally flared wing portions and wherein said laterally flared wing portions initiate at a point closer to the ABS than said tapered surface.

* * * * *

UNITED STATES PATENT AND TRADEMARK OFFICE
CERTIFICATE OF CORRECTION

PATENT NO. : 7,212,379 B2  Page 1 of 1
APPLICATION NO. : 10/815286
DATED : May 1, 2007
INVENTOR(S) : Hsu et al.

It is certified that error appears in the above-identified patent and that said Letters Patent is hereby corrected as shown below:

In claim 1, column 6, line 32, please replace "air hearing" with --air bearing--.

Signed and Sealed this

Eighth Day of June, 2010

David J. Kappos
*Director of the United States Patent and Trademark Office*